(12) United States Patent
Henderson et al.

(10) Patent No.: US 7,333,484 B2
(45) Date of Patent: Feb. 19, 2008

(54) SERVICES PROCESSOR HAVING A PACKET EDITING UNIT

(75) Inventors: Alex E. Henderson, Hillsborough, CA (US); Walter E. Croft, San Mateo, CA (US)

(73) Assignee: Intel Corporation, Santa Clara, CA (US)

( * ) Notice: Subject to any disclaimer, the term of this patent is extended or adjusted under 35 U.S.C. 154(b) by 1037 days.

(21) Appl. No.: 10/359,042

(22) Filed: Feb. 4, 2003

(65) Prior Publication Data

US 2003/0152078 A1 Aug. 14, 2003

Related U.S. Application Data

(63) Continuation-in-part of application No. 09/240,919, filed on Jan. 29, 1999, now Pat. No. 7,133,400.

(60) Provisional application No. 60/354,405, filed on Feb. 4, 2002, provisional application No. 60/095,825, filed on Aug. 7, 1998.

(51) Int. Cl.
*H04L 12/56* (2006.01)
*H04L 12/54* (2006.01)

(52) U.S. Cl. .................. 370/389; 370/401; 709/224

(58) Field of Classification Search ................ 370/389, 370/401, 390, 466, 465, 474; 709/200, 231, 709/232
See application file for complete search history.

(56) References Cited

U.S. PATENT DOCUMENTS

| | | | |
|---|---|---|---|
| 3,845,465 A | 10/1974 | Hosick et al. | |
| 4,627,024 A | 12/1986 | Whalen et al. | |
| 4,760,374 A | 7/1988 | Moller | |
| 5,390,173 A | 2/1995 | Spinney et al. | |
| 5,414,704 A | 5/1995 | Spinney | |
| 5,440,546 A * | 8/1995 | Bianchini et al. ........... | 370/413 |
| 5,509,006 A | 4/1996 | Wilford et al. | |
| 5,561,429 A | 10/1996 | Halberstam et al. | |
| 5,574,910 A | 11/1996 | Bialkowski et al. | |
| 5,608,662 A | 3/1997 | Large et al. | |
| 5,761,191 A | 6/1998 | VanDervort et al. | |
| 5,761,424 A | 6/1998 | Adams et al. | |
| 5,802,054 A | 9/1998 | Bellenger | |
| 5,884,033 A | 3/1999 | Duvall et al. | |
| 5,917,821 A | 6/1999 | Gobuyan et al. | |
| 5,951,651 A | 9/1999 | Lakshman et al. | |
| 6,181,698 B1 | 1/2001 | Hariguchi | |
| 6,226,710 B1 | 5/2001 | Melchior | |
| 6,266,700 B1 | 7/2001 | Baker et al. | |

(Continued)

FOREIGN PATENT DOCUMENTS

WO WO 94/01828 1/1994

OTHER PUBLICATIONS

Int'l Application No. PCT/US99/17501 Int'l Search Report dated Jun. 15, 2000.

(Continued)

*Primary Examiner*—Ajit Patel
(74) *Attorney, Agent, or Firm*—Blakely, Sokoloff, Taylor & Zafman LLP (57) ABSTRACT

A services processor includes an editing unit, which performs various functions for editing data packets, such as packet creation, packet encapsulation, and packet replication.

6 Claims, 6 Drawing Sheets

U.S. PATENT DOCUMENTS

| | | |
|---|---|---|
| 6,304,903 B1 | 10/2001 | Ward |
| 6,434,144 B1 | 8/2002 | Romanov |
| 6,597,694 B1 | 7/2003 | Fondekar et al. |
| 6,700,891 B1 | 3/2004 | Wong |
| 2002/0010793 A1 | 1/2002 | Noll et al. |
| 2002/0093347 A1 | 7/2002 | Henderson et al. |
| 2003/0152078 A1 | 8/2003 | Henderson et al. |
| 2003/0154328 A1 | 8/2003 | Henderson et al. |
| 2004/0083245 A1* | 4/2004 | Beeler, Jr. .................. 707/204 |
| 2004/0141207 A1* | 7/2004 | Warmus et al. ............ 358/1.18 |
| 2005/0135384 A1* | 6/2005 | Hipp et al. ................. 370/397 |

OTHER PUBLICATIONS

Int'l Application No. PCT/US99/17501 Written Opinion dated Oct. 20, 2000.

Int'l Application No. PCT/US01/46298 Int'l Search Report dated Aug. 2, 2002.

Int'l Application No. PCT/US01/46298 Written Opinion dated Aug. 19, 2002.

* cited by examiner

SERVICES PROCESSOR HAVING A PACKET EDITING UNIT

CROSS REFERENCE TO RELATED APPLICATIONS

This application is a continuation-in-part of U.S. application Ser. No. 09/240,919, filed Jan. 29, 1999 now U.S. Pat. No. 7,133,400, which is herein incorporated in its entirety by reference, which claims the benefit of U.S. Provisional Application No. 60/095,825, filed Aug. 7, 1998. This application also claims the benefit of U.S. Provisional Application No. 60/354,405, filed Feb. 4, 2002, which is hereby incorporated in its entirety by reference.

BACKGROUND

1. Field of the Invention

This invention relates to the processing of data with a services processor, and in particular to various functions for editing data packets, such as packet creation, packet encapsulation, and packet replication.

2. Background of the Invention

When data are to be processed by a computing device, a system, such as a data filtering engine, is needed to classify or filter such incoming data. For example, in a computer network, data transferred from one network device to another network device via the computer network are typically broken down into smaller blocks of data called packets. For a networking device to process an incoming packet, the device must filter or classify the incoming packet so it can determine what action should be taken on the packet. Packet filtering is a basic requirement of networking devices such as routers, upper layer switches, firewalls, and bandwidth managers. Once data packets are filtered and processed, they are output for use by the networking device.

What is needed is a system and method for filtering data that can quickly and inexpensively filter the data, process the data, and output the data for use by other devices on the network. In addition, existing systems typically have to move up to OSI Layer 7 to perform packet editing, which is hardware intensive and time consuming. Accordingly, what is further needed is a system and method for performing editing functions on data packets on chip at a lower OSI layer.

SUMMARY OF THE INVENTION

A services processor performs various functions for editing data packets, such as: inserting data in a packet; deleting data from a packet; overwriting data in a packet; adding or subtracting a constant, another piece of packet data, or register value from data in a packet; recalculating checksums in a packet; performing hashing operations on fields in a packet; and packet creation, packet encapsulation, and packet replication. These operations can be divided into (1) operations that are performed on a single packet, such as inserting data in a packet; deleting data from a packet; overwriting data in a packet; adding or subtracting a constant, another piece of packet data, or register value from data in a packet; recalculating checksums in a packet; performing hashing operations on fields in a packet; and (2) operations that operate on two packets, such as packet creation, packet encapsulation, and packet replication. In one embodiment, a data packet being processed is associated with a packet context that defines in part a set of encapsulation pointers edit registers and key registers. The single packet operations operate on a field in the packet and data in the registers in the packet context In another embodiment, the services processor creates a data packet using a packet template. The control processor creates an image of the packet to be created in an associated memory, initializes the fields in the image, and then copies the image to a packet memory or packet cache for further processing. The services processor accesses this image of the packet to be created using a Packet/Template Handle or pointer.

In yet another embodiment, a data packet being processed is associated with a packet context, which defines in part a set of encapsulation pointers. The services processor adds to an encapsulation associated with a data packet by retrieving an encapsulation template that includes one or more encapsulation pointers and the associated packet data, copying the encapsulation pointers from the encapsulation template into the packet context for that data packet and inserting the associated packet data into the data packet at the location specified by the encapsulation pointers. The services processor can then edit the added encapsulation using single packet instructions. Alternatively, the services processor removes the encapsulation associated with a data packet by deleting one or more encapsulation pointers associated with the data packet and removing the corresponding data from the packet.

In still another embodiment, the services processor replicates a data packet before the data packet is scheduled for output from the services processor. A switch is associated with a data packet being sent to a scheduler for output, where the switch indicates whether the processed data packet is to be replicated. If the switch is set to have the data packet replicated, the services processor makes a copy of the data packet in an associated memory, queues either of the data packets for output, and continues to process the other data packet in the packet context. This function is particularly useful for applications like packet flooding for Virtual Private LAN Services (VPLS) where multiple edited copies of a packet must be created.

DETAILED DESCRIPTION OF THE PREFERRED EMBODIMENTS

Figure 1:
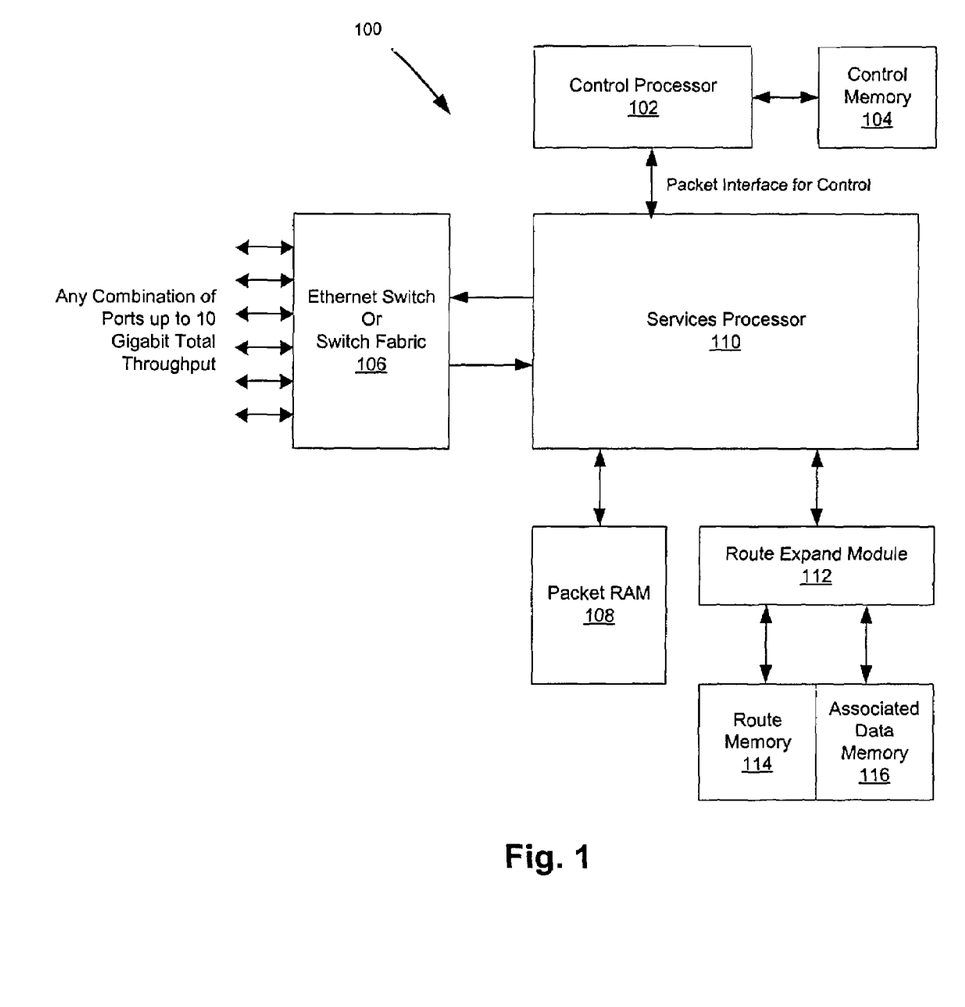
FIG. 1 is a diagram of an exemplary configuration a services processor coupled to a network.

Referring now to FIG. 1, an exemplary use of a full duplex, multiple port services processor 110 according to the present invention is shown. FIG. 1 illustrates the services processor 110 as part of a highly integrated Ethernet MAN access switch 100 with a 10 gigabit aggregate throughput. While present invention will be described in this context, those skilled in the art will recognize that the services processor 110 of the present invention can be designed for other data rates and has a variety of other uses including but not limited to being part of multi-service switches, metro switches, content switches, stateful firewalls, network probes enterprise routers, multi-protocol routers, Label Edge Routers (LER) and Label Switched Routers (LSR) (IP routers), wireless base stations, bandwidth managers, DSLARs and fast firewalls. As shown in FIG. 1, the Ethernet MAN access switch 100 preferably comprises a control processor 102, a control memory 104, an Ethernet switch or switch fabric 106, a packet memory 108, the services processor 110, a route expand module 112, a route memory 114, and associated data memory 116.

The control processor 102 is coupled to the services processor 110 by a packet interface and to the control memory 104 by a memory bus. The control processor 102 provides routing and switching protocol support for the services processor 110. The control processor 102 uses the packet interface for control plane functions such as configuration and event messages. Packets can also be sent to and received from the services processor 110 by the control processor 102 using the control plane. Thus, the operations and processing performed by the services processor 110 can be fully controlled using the control processor 102 and routines stored in the control memory 104.

The services processor 110 provides advanced switching functions (VPLS bridging, IP routing, fire walling, content switching including TCP termination) and feature processing (ACL and Subscriber Management) in this example. The services processor 110 is responsible for processing the packets to provide the appropriate routing and filtering as prescribed by the control processor 102. The services processor 110 is coupled to the Ethernet switch 106 for receiving and sending such packets. The services processor 110 is also coupled to the packet memory 108. The packet memory 108 is used to store packets prior to, during and after processing by the services processor 110. Finally, the services processor 110 is also coupled to the route expand module 112 that in turn is coupled to the route memory 114 and the associated data memory 116. The route expand module 112 is used to access large tables used by the services processor 110. For example, tables such as large label tables, route tables, and flow ID tables are stored in the route memory 114 and the associated data memory 116, and can be retrieved into a cache of the services processor 110 by the route expand module 112. One embodiment of this is described in patent application No. 60/402,359, filed Aug. 8, 2002, titled, "Tree Data Structure With Range-Specifying Keys and Associated Methods and Apparatuses," which is incorporated by reference.

Figure 2:
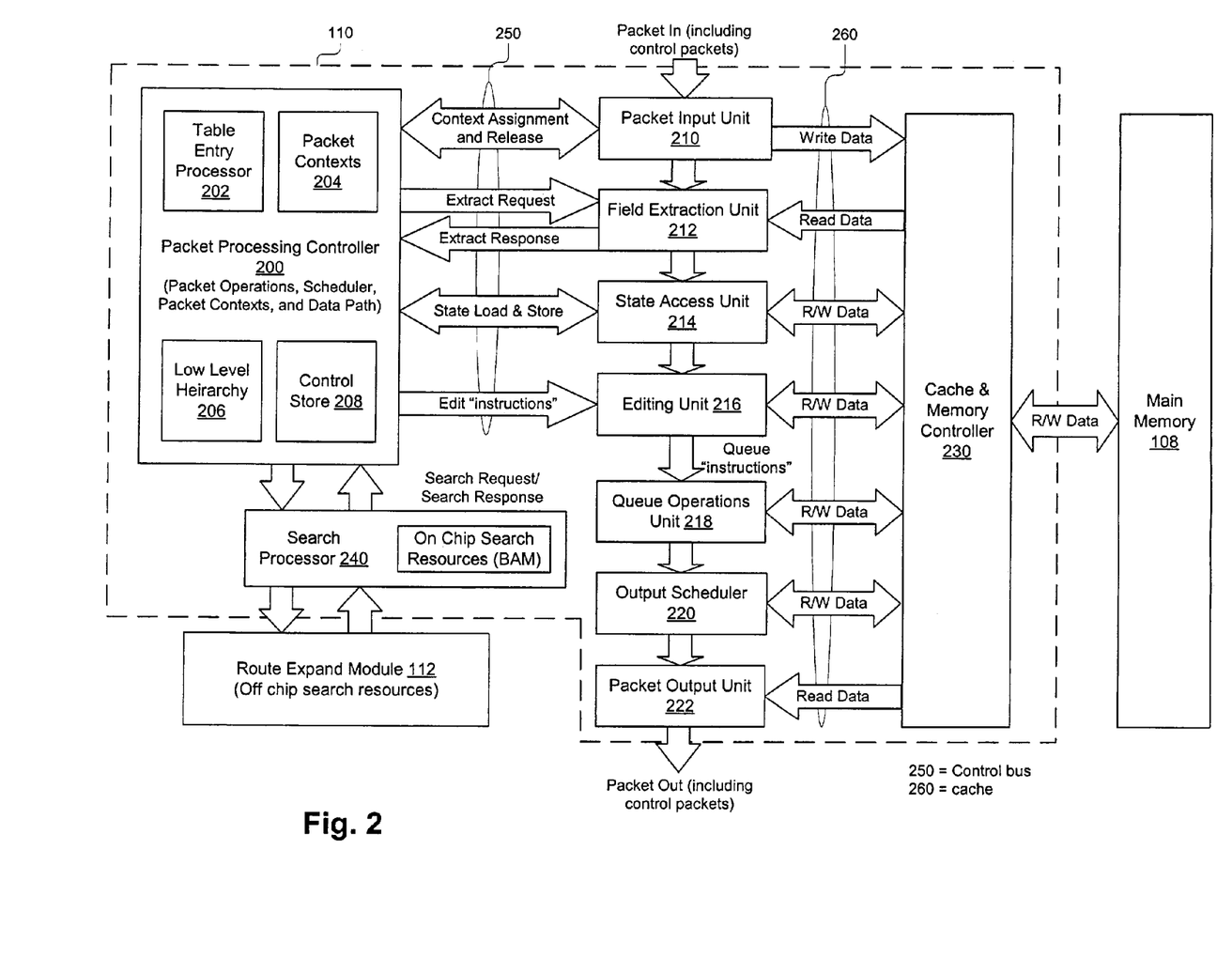
FIG. 2 is a diagram of one embodiment of a services processor architecture.

Referring now to FIG. 2, one embodiment for the services processor 110 is shown in more detail. Specifically, FIG. 2 shows the components of the services processor 110 and their coupling to the route expand module 112, and the main memory 104/108. In one embodiment, the services processor 110 is manufactured as a single integrated circuit with the route expand module 112, and a main memory 104/108 being separate integrated circuit chips. In the embodiment shown, the services processor 110 preferably comprises a packet processing controller 200, a packet input unit 210, a field extraction unit 212, a state access unit 214, an editing unit 216, a queue operations unit 218, an output scheduler 220, a packet output unit 222, a cache and memory controller 230, and a search processor 240. The packet processing controller 200 is coupled by a control bus 250 to the packet input unit 210, the field extraction unit 212, the state access unit 214, and the editing unit 216. The cache and memory controller 230 is coupled to the packet input unit 210, the field extraction unit 212, the state access unit 214, the editing unit 216, the queue operations unit 218, the output scheduler 220, the packet output unit 222 by a cache bus 260.

The packet processing controller 200 controls the operation of the services processor 110 in its processing and filtering of packets. The packet processing controller 200 is a control engine that controls the packet input unit 210, the field extraction unit 212, the state access unit 214, and the editing unit 216 as will be described in more detail below. The packet processing controller 200 preferably uses a table driven approach to control how packets are processed. The packet processing controller 200 preferably includes a table entry processor 202, one or more packet contexts 204 for each packet being processed, a low level hierarchy 206 and a control storage area 208. The low level hierarchy 206 and the control storage area 208 are part of the working memory of the packet processing controller 200 and provide additional areas for storing data need to process a packet.

The table entry processor 202 is part of the packet processing controller 200 and in response to commands by the table entry processor 202, the packet processing controller 200 issues control signals on the control bus 250 to the packet input unit 210, the field extraction unit 212, the state access unit 214, the editing unit 216, and/or issue instructions to the search processor 240. Execution of the table driven program by the table entry processor 202 makes the packet processing controller 200 effectively a table driven machine capable of processing multiple types of tables including look up tables having comparison data for searching, action tables specifying parsing and action instructions, and state tables for storing any state data that has a lifetime greater than the time required to process a single packet.

The table entry processor 202 retrieves program entries through use of the search processor 240 and then processes the entries and sends command signals to the packet processing controller 200. In response, the packet processing controller 200 issues control signals on the control bus 250 to the packet input unit 210, the field extraction unit 212, the state access unit 214, the editing unit 216, and/or issue instructions to the search processor 240. Execution of the table program entry by the table entry processor 202 within the packet processing controller 200 makes the packet processing controller 200 effectively a table driven machine capable of processing multiple types of tables including look up tables having comparison data for searching, action tables specifying parsing and action instructions, and state tables for storing any state data that has a lifetime greater than the time required to process a single packet.

A separate packet context 204 is used by the packet processing controller 200 for each packet as that packet traverses through the packet input unit 210, the field extraction unit 212, the state access unit 214, and the editing unit 216. The packet context 204 is a register set that keeps track of information associated with a packet while that packet is being processed. The packet context 204 includes several different kinds of registers. The packet context 204 preferably includes registers that determine which tables are currently controlling packet processing (analogous to a program counter in a CPU), and where in a packet the various protocols start (Encapsulation Pointers). For example, the packet context 204 includes registers with the following functions: a next instruction register that points to the next instruction to be processed for this packet context, multiple instruction registesr are used to create an instruction stack to support action and lookup tables analogous to subroutines in a CPU; a table handle register that points to the next lookup table to be processed in this packet context; a search result register that contains the result of the last search issued; a packet handle register that points to the packet associated with this packet context; one or more encapsulation pointer registers that acts as index registers for access to data in the packet pointed to by the packet handle register; one or more edit registers used by a packet editor to assemble complex edits that are applied to the packet; one or more key registers used to assemble multi-field search keys; one or more State Record Handle Registers used to access state data and a packet/context template handle used to access a block of packet buffer memory to load multiple registers in the packet context, as the source for a create packet operation, and as the source for a add encapsulation operation.

The packet processing controller 200 is also coupled to search processor 240 to send search requests and receive search responses. The search processor 240 is coupled to and interfaces with the route expand module 112 to retrieve data stored in the memories 114, 116 associated with the route expand module 112. In one embodiment, the search processor 240 includes resources for performing searches such as a Boundary Addressable Memory (BAM). The search processor 240 can search for the next table program entry to be processed by the table entry processor 202, a result from a lookup table stored in memory as directed by the table entry processor 202, or other information. One embodiment of this BAM is described in patent application Ser. No. 10/005,986, filed Nov. 7, 2001, titled, "Boundary Addressable Memory," which is incorporated by reference.

One particular advantage of the present invention is the inclusion of the cache and memory controller 230 in the services processor 110. The cache and memory controller 230 is coupled to main memory 104/108 and the cache bus 260. The cache and memory controller 230 is preferably large enough so that many applications can execute exclusively out of cache 230. The cache and memory controller 230 effectively hides the latency of memory access to the services processor 110. The cache and memory controller 230 are designed to optimize data across the memory bus and will return data out of order from memory if necessary. The cache and memory controller 230 may also be locked to enhance performance such as to ensure that cache includes all data structure components or locking the top of the hierarchy in cache to accelerate insertions. It should be understood that both the packet data as well as other state and control information may be stored in the cache 230. If lookup tables or action table program entries are stored in cache 230 or main memory 108, a memory access unit (not shown) adapted for the type of information being retrieved will be included in the services processor 110. The packet processing controller 200 will then use the memory access unit, such as a lookup table access unit or action table access unit to retrieve results from the lookup table or retrieve action entries.

The packet input unit 210 processes the packets as the services processor 110 first receives them. The packet input unit 210 is coupled to signal line 120 to receive packets from the Ethernet switch 106. The packet input unit 210 is also coupled to the cache and memory controller 230 by the cache bus 260 for storing the packets in the cache and memory controller 230. The packet input unit 210 stores the packet data into one or more free blocks in the cache 230. The packet input unit 210 is also coupled to the packet processing controller 200 by the control bus 250. The packet input unit 210 notifies the packet processing controller 200 that a new packet is being received. As soon as the first block has been filled or an end of packet is detected, the packet processing controller 200 assigns the packet a packet context 204 and initial table handle, and the other registers in the packet context 204 are cleared. The packet context is released for further processing by the packet processing controller 200.

Once a packet is released for further processing, packet processing controller 200 performs actions in a table specified by the initial table handle. These will typically be packet parsing operations such as extracting a field from the packet and putting the field into one or more key registers to construct a key.

The field extraction unit 212 is coupled to the cache and memory controller 230 by the cache bus 260 for reading data out of cache 230 and memory 104/108. The field extraction unit 212 is also coupled to the packet processing controller 200. The field extraction unit 212 is responsive to extract requests from the packet processing controller 200 and sends extract responses for further processing by the packet processing controller 200. The function of the field extraction unit 212 is to retrieve packet data from the cache, extract the portions of packets referenced or addressed by extract requests, and return the extracted data to the packet processing controller 200. If the packet processing controller 200 requests packet data from a portion of the packet that has not yet been stored in cache the processing of the requesting packet context will be suspended until the data is received.

The state access unit 214 processes state load and store requests from the packet processing controller 200. The state access unit 214 is coupled to the cache and memory controller 230 by the cache bus 260 for reading and writing data into and out of cache 230. The state access unit 214 is also coupled to the packet processing controller 200 to receive state change commands. More particularly, each packet context 204 preferably has a plurality of state registers and the packet processing controller 200 may maintain state tables. The data in the state tables is modifiable as is the data in the state registers. The state access unit 214 increases the processing throughput by retrieving the state information, updating and maintaining state data table information in response to instructions from the packet processing controller 200.

One particular advantage of the services processor 110 of the present invention is the ability to edit packets before they are output. The editing unit 216 is responsible for packet editing performed by the services processor 110. The editing unit 216 is coupled to the packet processing controller 200 and responsive to edit instructions received from the packet processing controller 200. The editing unit 216 is also coupled to the cache 230 to read and write data including packet data. For example, the editing unit 216 performs a variety of packet modification functions such as: inserting data in a packet, deleting data from a packet, overwriting data in a packet, adding or subtracting a constant, another piece of packet data or register value from data in a packet, recalculating checksums in a packet, performing hashing operations on fields in a packet, packet creation, packet replication, packet segmentation, and packet re-assembly. More specifically, exemplary packet modification operations that occur as part of the output process include: 1) Drop Packet—The drop packet instruction recycles the buffers used for the packet; 2) Output Packet—The output packet instruction causes the edit process to apply all accumulated edits and send it to the queue specified by the queue handle in the output instructions user data component; 3) Sync Edits—The sync edits instruction causes the edit process to apply all accumulated edits and sends it to the head of the input overflow queue; 4) Copy and edit—The copy and edit instruction creates a copy of the packet and sends it to the head of the input overflow queue, and cause the edit process to apply all accumulated edits and send it to the queue specified by the queue handle in the output instructions user data component; 5) Edit and copy—The edit and copy instruction causes the edit process to apply all accumulated edits and sends it to the queue specified by the queue handle in the output instructions user data component and creates a copy of the packet and send it to the head of the input overflow queue; and 6) Copy and Output—The copy and output instruction creates a copy of the packet, causes the edit process to apply all accumulated edits and sends it to the queue specified by the queue handle in the output instructions user data component. Once all packet editing has been performed on a particular packet, a queue instruction output by the editing unit 216 to the queue operations unit 218.

The queue operations unit 218 handles the ordering of packets before they are output. The services processor 210 groups or orders the packets into queues for output. The queues are preferably maintained in cache 230 and include a queue control block and link lists of packets. The queue operations unit 218 is coupled to receive queue instructions once the editing unit 216 has processed the packets. The queue operations unit 218 also has the capability to re-order packet for outputting. This helps ensure that the packets are output in the order received. The queue operations unit 218 is coupled to the cache 230 to prepare the data for output and maintain the queues in the cache 230. The operations unit 218 also manages the length of each queue to shape traffic responsive to queue instructions.

Sometime after the packets have been added to a queue by the queue operations unit 218, the output scheduler 220 removes them and sends them to packet output unit 222. The output scheduler 220 is coupled to read and write data from the cache 230. The output scheduler 220 preferably uses a hybrid list/calendar queue to determine the priority for outputting the packets. Transmit shaping is accomplished by associating a group of queues with a scheduler. When a queue is associated to a scheduler its scheduling parameters are initialized. The output scheduler 220 supports multiple scheduling algorithms including: a prioritized scheduler where the scheduler serves the queues in strict priority order; a weighted fair scheduler where scheduler serves the queues in proportion to their weight; a dual token bucket scheduler; a rate limited scheduler; or a Earliest Deadline First (EDF) scheduler. Once scheduled, the packet output unit 222 retrieves the packets from cache and outputs then from the services processor 110. The packet output unit 222 is coupled to the cache 230 by the cache bus 260 and has its output coupled by signal line 122 to the Ethernet switch 106.

Packet Context

Figure 3:
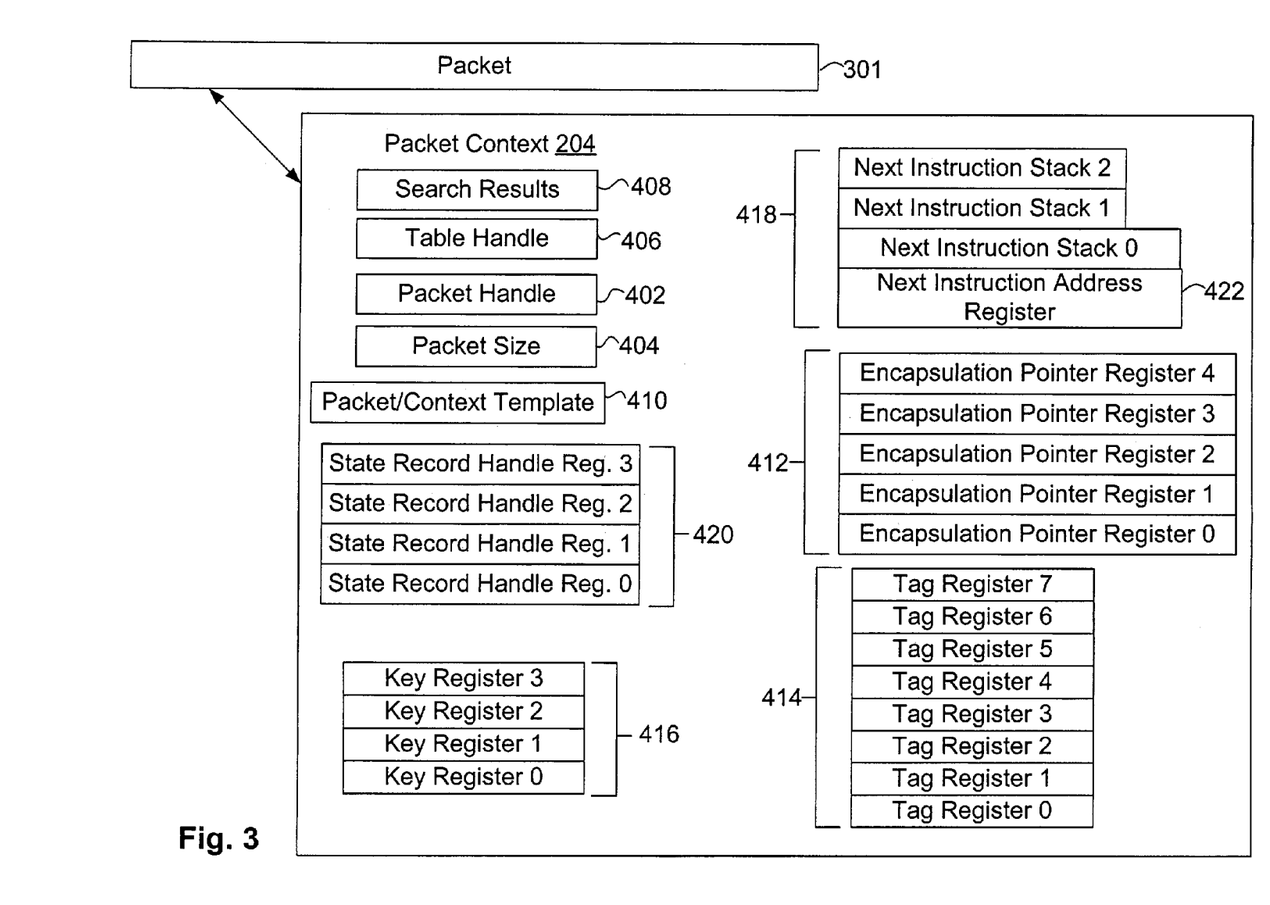
FIG. 3 is a block diagram that illustrates a packet and the packet context associated with that particular packet.

FIG. 3 is a block diagram that illustrates a packet 301 and the packet context 204 associated with that particular packet 301. When the packet 301 is first received the services processor 110, it is received by the packet input unit 210, which stores packet data into one or more free blocks in the cache 230. Control is then passed to the packet processing controller 200. To aid in processing, the packet processing controller 200 then initiates assignment of a packet context 204 to each received packet 301. In one embodiment, the packet context 204 is assigned to each packet 301 as soon has the packet fills the first block in cache 230 or the end of the packet 301 is detected. Each packet context 204 contains several different sets of registers for storing data related to the packet 301.

In these different sets of registers, the packet context 204 stores information related to a packet 301 and information used in processing of that packet 301 while that particular packet 301 is being processed. The packet context 204 is similar to a thread control in a processor in that the packet context 204 keeps track of the packet 301, what is being done to the packet 301, and what will be done to the packet 301. There is a separate packet context 204 for each packet 301 being processed by the services processor 110. In one embodiment, there are 256 packet contexts 204 in the services processor 110. This provides the services processor 110 with enough sets of packet context 204 registers to keep track of every packet 301 being processed. Other embodiments may have more or less packet contexts 204. When processing for a particular packet 301 is finished, the packet context 204 can be cleared and used for a new incoming packet 301. When a packet is received and there is no available packet context to assign to the packet, the packet will be placed in an input overflow queue. Packets in the input overflow queue can have higher, equal or lower priority than new input packets for packet context assignment.

What follows is a description of the information stored in a packet context 204 for each packet 301 in one embodiment of the present invention. In other embodiments, more, less, or different information can be stored in a packet context 204.

The packet context 204 includes information about the packet 301 itself. A packet handle register 402 stores a pointer to the location in memory of the packet 301 to which this packet context 204 relates. A packet size register 404 stores the size of the packet 301 to which this packet context 204 relates. In the case where packet processing starts as soon as the first cache block is full, the size of the packet may not be known when processing starts. In this case logic in the packet processing controller 200 and associated with the packet size register will detect references to the packet size before it becomes valid. If such an access occurs the processing of the packet will be suspended until the size is known.

A table handle register 406 stores a pointer to a lookup table that will be used next during packet processing. A search results register 408 stores the information returned from the last use of a lookup table.

A packet/template handle register 410 stores a pointer to another packet or to a template in memory. The packet/template handle register 410 will store a pointer to another packet in memory when, for example, an action that involves two packets is to be performed. One such example is when a concatenation of the packet 301 to which the packet context relates with another packet is performed. In one such an example, the packet handle register 402 stores a pointer that points to a first packet with a first header and a first payload. The packet/template handle register stores a pointer that points to a second packet with a second header and a second payload. The next instruction address register 422 stores a pointer to an action that, when processed by the table entry processor 202, causes the payload of the second packet to be added on to the payload of the first packet, resulting in the packet having the header and a payload that includes both the first and second payloads. This capability can be used in conjunction with other editing operations to perform complex packet editing operations such as IP reassembly. The packet/template register 410 can also store a pointer to a template stored in memory. This is useful, for example, when the packet 301 is of a known type. All the information common to that type of packet can then be retrieved from the template rather than from the packet 301 itself. This can improve efficiency in gathering information about a packet 301.

Encapsulation pointer registers 412 store encapsulation pointers that point to locations within the packet 301. Encapsulation pointer registers 412 are used to create encapsulation relative addresses within the packet 301. The first encapsulation pointer register 412, encapsulation pointer register 0, has a value of 0 and points to the beginning of the packet 301. The other encapsulation pointer registers 412 point to other arbitrarily defined locations within the packet. In the illustrated embodiment, there are five encapsulation pointer registers 412, although in other embodiments there may be more or fewer of these registers.

The encapsulation pointers are used for simplified packet data accesses. In one embodiment, encapsulation pointer registers 412 are 16 bits, which allowable access to 64 kB packets. Typically, the different encapsulation pointer registers 412 point to the start of various protocols found within a packet. For example, if the packet 301 is in Ethernet packet, encapsulation pointer register 0 points to the start of the Ethernet header. Encapsulation pointer register 1 could point to the start of an MPLS label stack, encapsulation pointer register 2 to the start of an IP header, and encapsulation pointer register 3 to the start of a TCP header. These encapsulation pointer registers 412 make it easy to create relative addresses, for example eight bits into the TCP header, and simplifies programming.

Figure 4:
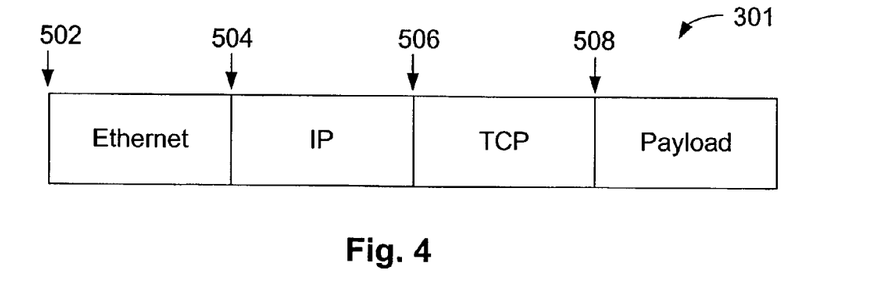
FIG. 4 is a block diagram that illustrates a packet and the location within the packet to which the encapsulation pointers point.

FIG. 4 is a block diagram that illustrates an examplary packet 301 and the location within the packet 301 to which the encapsulation pointers point. Encapsulation pointer 0 502 points to the beginning of the packet 301. Encapsulation pointer 1 504 points to the beginning of the IP header, encapsulation pointer 2 506 points to the beginning of the TCP header, and encapsulation pointer 3 508 points to the beginning of the packet payload. The programming environment or Application Programming Interface (API) for the packet processing controller 200 allows a symbolic name to be associated with each encapsulation pointer. For example, in FIG. 4, a programmer may use the symbolic name "packet" to indicate encapsulation pointer 0 502, which points to the beginning of the packet 301. Similarly, a programmer may use the symbolic name "IP" to indicate encapsulation pointer 1 504, which points to the beginning of the IP header. Thus, a programmer need not know the location within the packet 301 of different fields, instead simply using the symbolic names. The symbolic names allow relative addressing as well. The programmer may specify a location relative to a symbolic name, such as the second byte of the IP header.

Figure 5:
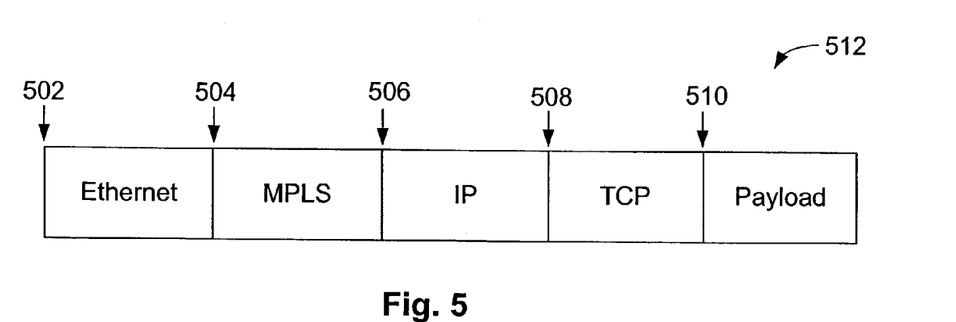
FIG. 5 is a block diagram that illustrates the packet after editing, and the locations within the edited packet to which the encapsulation pointers point.

FIG. 5 is a block diagram that illustrates the packet after editing 512, and the locations within the edited packet 512 to which the encapsulation pointers 502-508 point. In FIG. 5 the editing operation added an MPLS field to the packet 301. After editing, encapsulation pointer 0 502 still points to the beginning of the packet 512, but the other encapsulation pointers 504-508 no longer point to the same locations in the packet. Encapsulation pointer 1 504 points to the beginning of the MPLS field, encapsulation pointer 2 506 points to the beginning of the IP header, encapsulation pointer 3 508 points to the beginning of the TCP header, and a new encapsulation pointer 4 510 points to the beginning of the payload. However, the API for the packet processing controller 200 modifies the symbolic names so that after the edit operation, the symbolic names still relate to the same fields in the packet 512. Thus, the symbolic name "packet" still indicates encapsulation pointer 0 502. However, the symbolic name "IP" indicates encapsulation pointer 2 506, rather than encapsulation pointer 1 504. When a new field is added, and the encapsulation pointers change, the symbolic names are changed as well so that each symbolic name still points to the same header or field within the edited packet 512 as it did before the edit. This simplifies the programming since programs can manipulate protocol data such as the Checksum field in the IP header.

Returning back to FIG. 3, the packet context 204 also includes a set of edit registers 414. When an action table indicates that an edit operation should be performed on the packet 301, that edit operation to be performed is stored in one of the edit registers 414. When control is passed to the editing unit 216, all of the edits stored in the edit registers 414 are performed on the packet 301. The edits are stored in the edit registers 414 based on where in the packet the edits will be applied. For example, edit register 0 contains the edit to be applied to the information in the packet 301 that is stored closest to the beginning of the packet 301. Edit register 1 contains the edit to be applied next closest to the beginning of the packet 301, and an edit stored in edit register 7 is applied nearest to the end of the packet 301.

Figure 6:
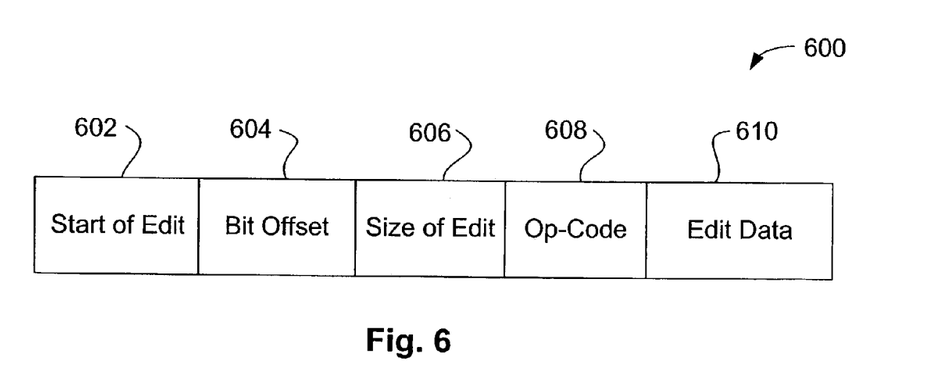
FIG. 6 is a block diagram that illustrates the information stored in the edit register in one embodiment of the present invention.

FIG. 6 is a block diagram that illustrates the information stored in the edit register 414 in one embodiment of the present invention. The first field 602 is a packet absolute address of the first byte that will be modified by the edit. This determines in which edit register 414 this edit will be stored. The second field 604 is a bit offset that specifies the offset of the first bit within the specified byte to be modified. The third field 606 is the number of bits that will be modified by the edit. The fourth field 608 is a code that specifies which editing operation will be performed. Examples of possible editing operations include: an insert operation, an override operation, a delete operation, and a checksum operation. The fifth field 610 stores data used in the edit operation. For example, if the edit operation is to insert data, the fifth field 610 stores the data to be inserted into the packet. Information from the second through fifth fields 604-610 is stored in the appropriate edit register 414.

Returning again to FIG. 3, the packet context 204 also includes a set of key registers 416. The key registers 416 store data used as keys. For example, one use of these keys is when a lookup operation is performed with a lookup table. The keys can be used in other ways as well. In one embodiment, each key register 416 includes a length field that specifies the number of bits the key register 416 contains, and a key field that contains the key itself. In the illustrated embodiment, there are four key registers 416, although other numbers of key registers 416 can also be used in different embodiments. Parsing actions can store multiple fields in a single key register 416 to allow multiple field lookups. Examples of these multiple field lookups include the Cisco n-tuple, Destination Address/Diff Serve Code Point (DA/DSCP), and the IP fragment (IP SA/Packet ID) table lookups.

The packet context 204 also includes a set of registers used as an instruction stack, known as next instruction registers 418. The first register of the next instruction registers 418 is known as the next instruction address register 422. This next instruction address register 422 stores the location of the next instruction to be executed by the packet processing controller 200 and effectively serves as a program counter. The rest of the registers of the next instruction registers 418 make up a next instruction stack. Providing a stack of next instruction registers allows implementation of subtables, similar to subroutines. When a first table (a primary table) calls another table (a subtable), the next instruction address register 422 identifies the next instruction in the subtable, and the next instruction stack identifies the next instruction in the primary table. This allows a process to return to the correct point in the primary table once execution of the instructions in a sub table have been completed.

Finally, the packet context 204 includes a set of state record handle registers 420. State records contain data that the services processor 110 stores for longer than the duration of the processing of one packet within the services processor 110. For example, state records can store information about a TCP session. A TCP session will span many packets, and be related to all the packets that make up that session. If a packet to which the packet context 204 relates is part of a TCP session, it is typically desirable to update a TCP state record with information about that packet. The state record handle registers 420 provide a link to the state records related to that packet so that information may be retrieved from the state record, or the state record may be modified as required. In one embodiment, the state record handle registers 420 can be loaded from the data extracted from the packet 301 in a parsing operation, from the return value of a lookup operation, or from other operations.

Table Driven Packet Processing and Tables

Figure 7:
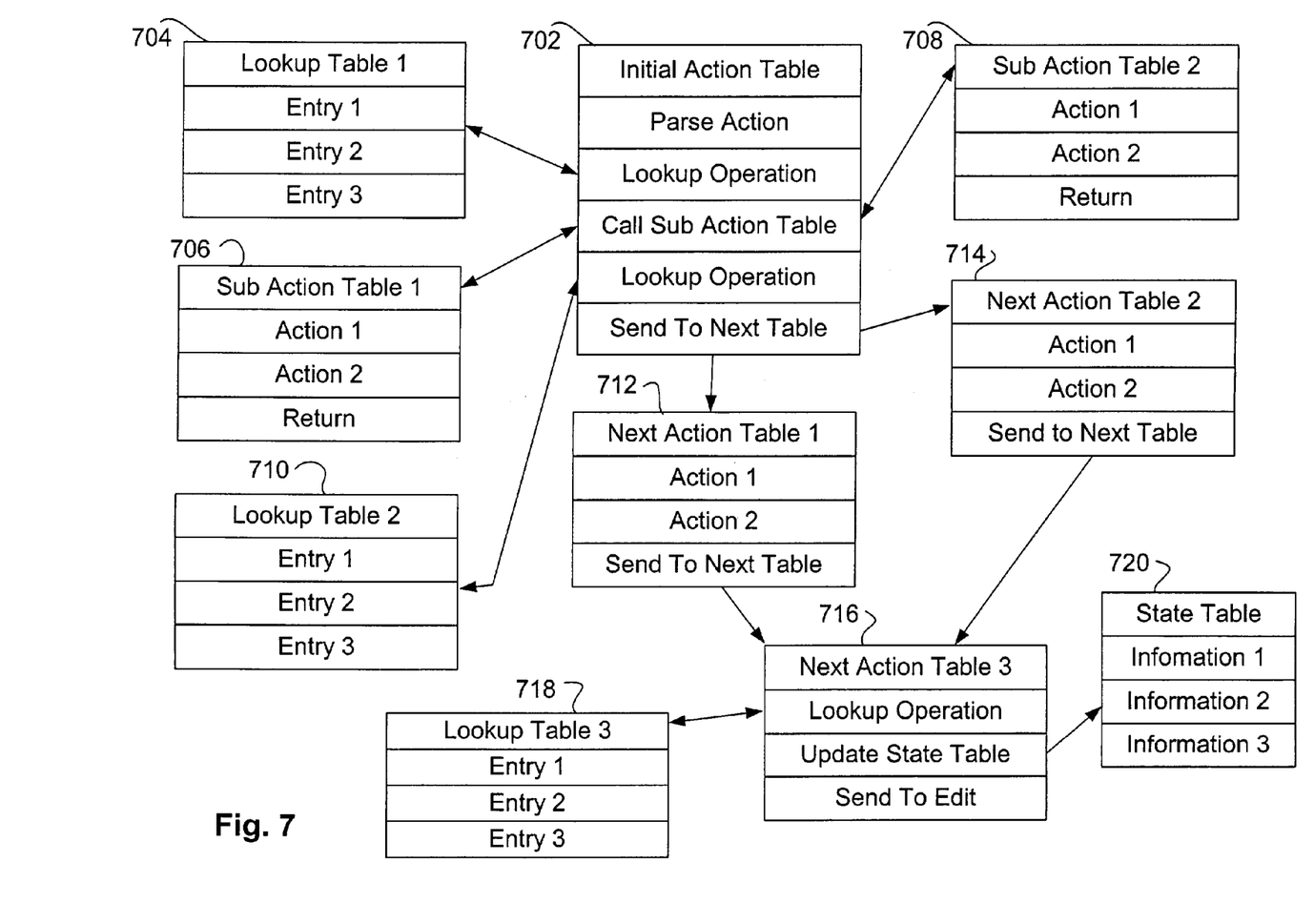
FIG. 7 is a block diagram that illustrates action tables, lookup tables, and state tables, and how these table types are used by the packet processing controller.

In one embodiment of the present invention, there are two primary types of tables used by the services processor 110 to process a packet: lookup tables and action tables. A third table type, a state table, may also be used or modified during packet processing. FIG. 7 is a block diagram that illustrates an exemplary table based program, the action tables, lookup tables, and state tables used by the program, and how these table types are used by the packet processing controller 200 in the services processor 110 to process a packet 301 according to the table based program. The example of FIG. 7 is a simple descriptive overview of one example of how a packet 301 can be processed. The present invention allows a programmer to specify how a particular packet 301 is processed by specifying the tables used in a table based program and/or creating tables. Thus, actual processing performed on the given packet 301 may be different in substance and/or complexity from the example described.

The packets 301 are processed using a table based processing scheme. After assignment of the packet context 204, the packet 301 is assigned an initial action table 702 by the services processor 110. The location of the first instruction in the initial action table 702 is stored in the next instruction address register 422 in the packet context 204. In one embodiment, the other registers in the packet context 204 are cleared at this time. The location of the first instruction in the initial action table 702 may be determined by the port through which the packet 301 arrived, for example, so that a packet arriving from a set port will have a set initial action. Other schemes for determining the location of the first instruction in the initial action table 702 may also be used.

The initial action table 702, as well as other action tables, are tables that contains linked lists of one or more actions to be taken to process the packet 301. Actions identified by the action tables can include packet parsing operations, edits that specify editing operations to be done to the packet 301, search operations, and other operations.

Figure 8:
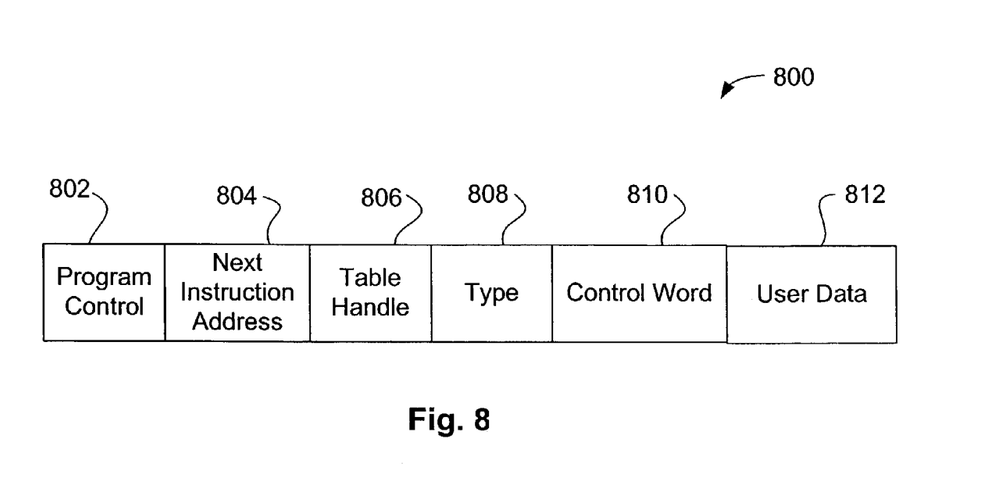
FIG. 8 is a block diagram that illustrates an example action entry of an action table according to one embodiment of the present invention.

FIG. 8 is a block diagram that illustrates an example action entry 800 of an action table according to one embodiment of the present invention. One or more of these action entries 800 linked together make up each action table. The action 800 includes a program control field 802, a next instruction address field 804, a table handle field 806, a type field 808, a control word field 810, and a user data field 812. The program control field 802 may indicate that the process should continue, that a call should be made to another process or action table, or that this current action table is complete and the process should return to a higher level table. The next instruction address field 804 contains the address in memory for the next instruction in this action table to be executed. The information in the next instruction address field 804 is stored in the next instruction address register 422 of the packet context 204. The next instruction address field 804 allows action tables to be stored as logical tables, with each action pointing to the location in memory of the next action.

The table handle field 806 allows the use of subtables. If an address of an action table or a lookup table is in the table handle field 806, and the program control field 802 is a call to another table, the table referenced in the table handle field 806 will be used as a subtable. If the sub table is a lookup table, information from the table handle field 806 will be stored in the table handle register 406 of the packet context 204. If the subtable is an action table, information from the table handle field 806 will be stored in the next instruction address register 422 of the packet context 204. When the information from the table handle field 806 is stored in the next instruction address register 422, the next instruction address from the next instruction address field 804 is "pushed" to the next instruction register in the next instruction stack 418 of the packet context 204. This allows the packet context 204 to keep track of the next instruction to be performed in the table while any actions or operations specified in the subtables are performed. When a sequence of instructions in the called subtable ends with a return action, the return will "pop" the instruction address stack 418 so that the information in next instruction stack 0 gets moved to the next instruction address register 422. This allows the packet processing controller 200 to return to the correct spot within the first table from which the subtable was called. Since there are multiple next instruction stack registers, subtables may also call further subtables.

The type field 808 indicates what type of action is to be taken. Examples of types include a parsing operation, a modification operation, and a search operation that uses one or more of the keys stored in the key registers 416 of the packet context 204. The control word field 810 contains the control word that tells the packet processing controller 200 which operation to execute. The format of the control word in the control word field 810 will depend on what type of action is to be taken. Finally, a user data field 812 contains programmer-specified information related to the action that can be used by the packet processing controller 200, the editing unit 216, or other components during processing of the packet. For example, if the action is to add a tag to a packet, the user data may contain the information that makes up the tag and is added to the packet when the tag is added.

The user data field 812 may also specify information to be loaded into a state record handle register 420.

Returning to FIG. 7, the packet processing controller 200 to retrieve the first action to be performed from the location specified in the next instruction address register 422 and sends it to the table entry processor 202. Next, the table entry processor 202 performs the initial action specified by the initial action table 702. In the example shown in FIG. 7, the initial action is a packet parsing operation that extracts a field from the packet 301 and constructs a key from the extracted field, although other initial actions could also be specified by the initial action table 702. To extract the field from the packet, the packet processing controller 200 requests that the field extraction unit 212 extract a field from the packet 301 and send that field to the packet processing controller 200. Next, the table entry processor 202 constructs a key from the extracted packet field. Note that, while the description and illustration only uses one entry in the initial action table 702 to extract the field and construct a key, in some embodiments, it may take multiple actions in the initial action table 702 to perform the field extraction and key construction operations.

Figure 9:
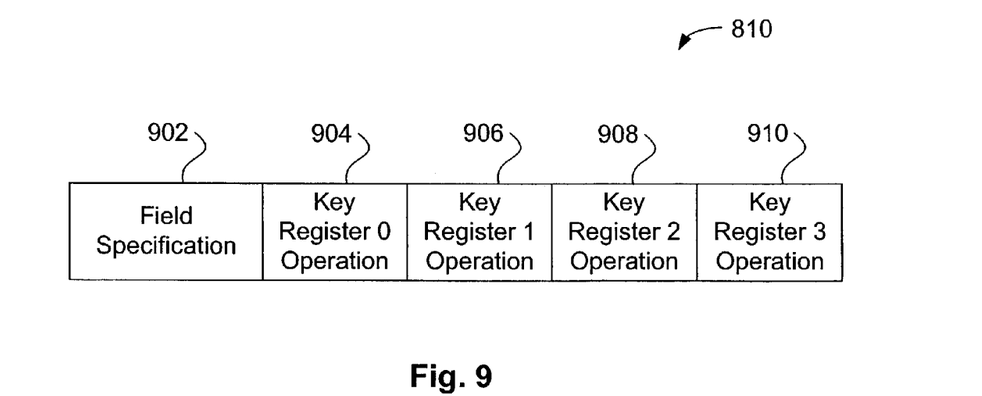
FIG. 9 is a block diagram that illustrates the information in the control word field of a parsing action entry according to one embodiment of the present invention.

FIG. 9 is a block diagram that illustrates the information in the control word field 810 of a parsing action entry according to one embodiment of the present invention. The parsing action extracts information from the packet 301 and constructs a key using this information. The field specification 902 of the parsing instruction includes a specification of a source for input data, which is typically a location in the packet, and the bit length of the information to be extracted. The key register operations 904-910 specify what operations are to be performed on the various key registers 416 of the packet context 204. In one embodiment, the operations that can be performed on the key registers are a "non op" that does nothing to the key registers 416, a load key register operation that places input dates in the key registers 416, a shift and load key register operation that shifts the contents of the key registers 416 and places additional bits to the location within the key register 416 from which the previous information was shifted, and a hash key register operation that uses a hash function on the information already in the key register 416 as well as the new input information to come up with a new key.

Returning to FIG. 7, the next operation in the initial action table 702 is a lookup operation. In a lookup operation, the table entry processor 202 uses a key from the key registers 416 in conjunction with the search processor 240 or memory access unit to search the lookup table 704 specified by the lookup operation action and return information. Lookup tables have entries that store compared and search result data. A lookup table 704 includes a match type/default rule that defines the match operation performed by the table and a search result for a no match condition, and can also include one or more classification or match rules rules. The lookup table 704 may be searched by the search processor 240 under command from the table entry processor 202, or may be searched by a memory access unit (not shown) under command from the table entry processor 202 if the lookup table is stored in cache 230 or main memory 108. Typically, the information returned from the lookup table is a value and a pointer. The value could be an argument to be used in an action, information used to edit the packet, or other information. The pointer typically points to the next action to be performed.

In the embodiment illustrated in FIG. 7, the information returned from the lookup table 704 includes an identification of an action subtable that is to be called next by the initial action table 702. In this example, the lookup operation is used to determine which of two different action subtables 706 and 708 are to be called by the initial action table 702. Thus, the information extracted from the packet was used to construct a key used with a lookup table 704 to determine which action subtable 706, 708 is called. Different sub action tables 706, 708 will be called depending on the information within the packet.

When an action subtable 706, 708 is called, the table entry processor 202 causes a pointer to the first action in the sub action table 706, 708 to be stored in the next instruction address register 422 of the packet context 204, and "pushes" the pointer to the next action in the initial action table 702 up into the next instruction stack 418 of the packet context 204. Then, the actions in the called sub action table 706, 708 are executed by the table entry processor 202. The last action in each sub action table 706, 708 is a return to the initial action table 702. The act of returning from the sub action table 706, 708 causes the pointer from the next instruction stack 418 in the packet context to be "popped" into the next instruction address register 422 by the table entry processor 202. This allows the next action in the initial action table 702 to be executed in its correct order.

As described above, the different values returned from the lookup table 704 allow a branching function, so that any one of multiple sub action tables 706, 708 may be called. Further, since a sub action table is called, the actions in the sub action table are executed, and then the process returns to the initial action table, the sub action tables act as subroutines. While each illustrated sub action table 706, 708 simply specifies multiple actions to be executed linearly and then return to the initial action table 702, more complex arrangements can also be used. For example, a sub action table 706, 708 can specify lookup operations, make a call to another sub action table, or perform other operations.

The next action in the initial action table 702 is another lookup operation using a second lookup table 710. The key used in this lookup operation may have been generated by one of the actions in one of the sub action tables, may have been generated by another parsing action and extracting more information from the packet 301, or through another operation. This key is used with the second lookup table 710 to return information identifying a next action table to be used after the initial action table 702. Thus, this lookup operation action acts as another branch operation.

In the example illustrated in FIG. 7, there are two possible next action tables 712, 714 that can be called. The actions identified in whatever next action table 712, 714 was called are executed in order. For example, the actions in the action tables 712, 714 may specify multiple edits to be performed on the packet 301. In this case, the edits to be performed are stored in the edit registers 414 of the packet context 204 for that packet 301. In the illustrated embodiment, neither next action table 712, 714 has a branch, and the final action in both of the next action tables 712, 714 include a pointer the same third next action table 716.

Since both of the next action tables 712, 714 end with a pointer to the third next action table 716, the possible branches that occurred with tables 712 and 714 have rejoined, so that no matter which of the first set of next action tables 712, 714 was executed, the same third next action table 716 is executed next. Such divergence and convergence of process flow is possible throughout the process, depending on how the tables have been programmed by the programmer. In some cases, divergence may occur without convergence, for example, or other process flows may be programmed.

The third next action table 716 includes a lookup operation. In this described example, a packet parsing operation is first performed and the destination address of the packet 301 is used as a key. The value returned from the lookup table 718 is the port in the switch from which the packet 301 will be sent after processing. After the lookup operation, the third next action table 716 specifies an "update state" action. This action updates the information stored in a state table 720. State tables store information that is useful for more than the lifetime of one packet. In this case, the state table 720 stores information about the ports of the switch 106. One or more of the information fields in the state table 720 stores the number of packets that have been sent from each output port. When a packet 301 is to be sent out through particular output port, the state table 720 is updated to reflect that another packet has been sent from that port. Other types of state tables that may be useful and updated during packet processing include TCP session state tables that store information about a TCP session of which the packet being processed is a part. The records in a state table may be arbitrarily defined by a programmer.

The packet processing is then terminated by a "send to edit" action that passes processing control to the editing unit 216 to apply the editing operations specified by previous actions and stored in the edit registers 414 of the packet context 204. The editing unit 216 then sends the edited packet 301 to the queue operations unit 218 to be queued for output. A programmer can also specify other actions to terminate packet processing. For example, the process can be terminated by an action that drops the packet, an action that passes control to the editing unit 216 to apply the specified editing operations and then returns control to the packet processing controller 200 for further actions to be done on the packet 301, or another action that terminates the process.

Packet Creation

During standard operation, the services processor 110 receives data packets, processes the packets, and then outputs them for use by other network devices. However, in one embodiment of the invention, the editing unit 216 of the services processor 110 is further capable of creating new data packets. The creation of new data packets in the services processor 110 facilitates functions such as protocol keep alive and TCP termination (required for iSCSI).

The editing unit 216 creates a new data packet using a packet template. The data structure that defines a packet can also be used to create and store packet templates, which may be stored in the cache 230 for quick access. An API for the services processor 110 supports creation of packet templates, allowing a user to make new templates based on previously defined protocols or as otherwise required for the application. Packet templates can be created by the programmer (instructions executed as part of initialization when a program is started) and are stored in the main memory 104/108. The packet template may be preloaded in the cache 230 and retrieved by the editing unit 216 when needed. Alternatively, the control processor 102 or the services processor 110 can create a packet template at runtime.

In the first step of creating a new data packet, the control processor 102 creates an image of the packet to be created in the control memory 104. In one embodiment, the creation of an image of the packet comprises allocating a space for a packet image, assigning a name to it, and initializing data within the image. An example of a function call for creating a new packet from a template is:

Packet_Image_Handle=Packet_Image_Create(Template_Name, Size_in_Bytes, Fill_Value)

This API function call takes as inputs the desired template, the size of the packet to be created, and initialization parameters. The function then creates an image of a data packet based on the corresponding template and returns a handle for that packet image. This handle is used by future functions to process the image into the desired data packet.

The packet image is then initialized appropriately depending on the type of packet is to be created, the source and destination of the transmission, and any other relevant parameters. For example, the source address in the packet is set to the source corresponding to the service's processor 110. This may include setting the source IP and Ethernet addresses in the data packet. This step can be performed by the control processor 102 on a packet image stored in memory 104.

After the above steps are performed, a "control message" is created in the control memory 104 of the control processor 102. This control message is an instruction for the services processor 110 to "create packet template." This message includes at the payload the "packet template" that the services processor 110 will place in its main memory 104/108 when it executes the "create packet template" instruction/packet. This payload includes initial values for packet context registers and packet data. This function returns a packet template handle that can be used later. For example, a timeout counter will assign a packet context and begin execution in an action table. The action table will typically load the packet template handle into the packet/context template handle and start queuing editing operations to be performed to generate an output packet.

When the services processor 110 executes the "create template" instruction, it allocates memory for the payload, or new data packet. This may require more than one buffer in main memory 104/108. If so the services processor 110 constructs the linkages between buffers that are required to make a data packet, and the services processor 110 stores the payload in the buffers. The services processor 110 then returns a message that includes a handle to the packet template.

In one example application, a program running on the control processor 102 could define a packet template named "IP_Over_Ethernet" that consists of an Ethernet "MAC_Header" that comprises:
"MAC_Destination Address"
"MAC_Source Address"
"MAC_Type_Length"

followed by an "IP_HEADER" that comprises:
"IP_Version"
"IP_Header_Length"
"IP_TOS"
"IP_Total_Length"
"IP_Packet ID"
"IP_TTL"
"IP_Protocol"
"IP_Header_Checksum"
"IP_Source_Address"
"IP_Destination_Address"

The names in quotes above are symbolic references to fields in the packet template. MAC_Header is the name of the outermost encapsulation, and IP_Header is the next encapsulation layer. The name IP_Over_Ethernet is equivalent to the handle returned to the control plane processor in the response to the "create template" instruction. Since the size of MAC_Header is 14 bytes, the packet template (the payload of the "create template" message) will include an initial value of "14" for encapsulation pointer 1. The programmer might then construct an action table, like:
Packet_Handle (a reserved register name)=IP_Over_Ethernet MAC_Header.MAC_Source Address=Port3_MAC_Address In this context, this translates to PacketData[EP0+6]=Port3_MAC_Address, a constant defined elsewhere in the code. From the point of view of the services processor 110, this corresponds to:
TagRegister0.Data constant
TagRegister0.Encapsulation=EP0
TagRegister0.Offset=6
TagRegister0.Operation=Overwrite( )
IP_Header.IP_Source_Address=Port3_IP_Address In this context, this translates to PacketData[EP1+12]=Port3_IP_Address, another constant.

Adding/Removing Encapsulation

In another embodiment, the services processor 110 includes editing operations for manipulating complete encapsulations. One function, Add_Encapsulation, applies data from an "encapsulation template," stored in a packet data buffer, to a data packet being processed in the services processor 110. The encapsulation template can be up to the size of one entire packet buffer. The Add_Encapsulation function is useful for applying a set of encapsulation pointers to a data packet. When an encapsulation template is applied to a data packet, the editing unit 216 copies the encapsulation pointers defined by the template into the corresponding encapsulation pointer registers for the packet context of the corresponding data packet. The function can further specify copying all or a portion of the encapsulation pointers. In the example above, if an encapsulation is inserted between the MAC_Header and IP_Header, the contents of the Encapsulation Pointer 1 (i.e., IP_Header) will be moved to Encapsulation Pointer 2, and the contents of Encapsulation Pointer 2 to Encapsulation Pointer 3, and so on.

For example, this function can be used to add an outer MAC header and MPLS label stack to an Ethernet packet for VPLS applications. The contents of the added encapsulation can be edited later with additional instructions. This functionality allows for the bulk of a packet's encapsulation to be added with a single operation with additional editing operations as needed, ultimately decreasing the total number of operations required to encapsulate a packet.

A second function is Remove_Encapsulation, which is used to remove a large number of bytes from a packet. For example, removing an encapsulation at Encapsulation Pointer N has the effect of deleting the data therein and moving the contents of Encapsulation Pointer N+1 to Encapsulation Pointer N, and so on.

Packet Replication

In another embodiment, the services processor 110 performs data packet replication. This feature enables the services processor 110 to make copies of a data packet in a single operation, send the original packet off, and continue to process the copied packet. This is useful, for example, in applications like VPLS and IP Multicast routing, which require extensive packet replication. The replicated packets are individually edited before output. These functions are understood by an extension of the packet/context template.

Packet replication is supported by an extension to the queuing actions. When the editing unit 216 provides the "queue instructions" to the queue operations unit 218, an optional switch is included in those instructions or as an additional data signal provided with the instructions. This switch can be a bit in the "queue instructions" word provided by the editing unit 216 to the queue operations unit 218. Responsive to this switch, the queue operations unit 218 causes the packet to be copied before it is scheduled for output by the output scheduler 220. The packet output unit 222 outputs the packet from the services processor 110, leaving the copied packet to be processed further by the services processor 110.

After being copied, the packet that is scheduled and outputted is no longer associated with its packet context. This is because queuing a packet is a "terminal action," which ends a packet thread and releases the packet context for the next input packet or timer event. Accordingly, the packet context is used to continue processing of the copied packet. Alternatively, the copied packet may be scheduled and outputted from the services processor 110, leaving the original packet to be processed further in the services processor 110. This functionality enables, e.g., the quick and efficient multicast of data packets that are highly similar (i.e., where only the destination address needs to be changed).

The foregoing description of the embodiments of the invention has been presented for the purposes of illustration and description. It is not intended to be exhaustive or to limit the invention to the precise forms disclosed. Persons skilled in the relevant art can appreciate that many modifications and variations are possible in light of the above teaching. It is therefore intended that the scope of the invention be limited not by this detailed description, but rather by the claims appended hereto.

We claim:

1. A method for creating a data packet in a services processor from a packet template, the method comprising:
    creating an image of the packet template in an associated memory, the image having fields corresponding to a data packet to be created;
    initializing the fields of the image; and
    copying the image to a cache memory for use by the services processor.

2. A services processor for creating a data packet in a services processor from a packet template, the services processor encoded with instructions for:
    creating an image of the packet template in an associated memory, the image having fields corresponding to a data packet to be created;
    initializing the fields of the image; and
    copying the image to a cache memory for use by the services processor.

3. A method for adding an encapsulation to a data packet, the data packet associated with a packet context in a services processor wherein the packet context includes a set of encapsulation pointers, the method comprising:
    retrieving an encapsulation template that defines one or more encapsulation pointers; and
    copying the encapsulation pointers from the encapsulation template into the packet context for the data packet.

4. A services processor for adding an encapsulation to a data packet, the services processor encoded with instructions for:
    retrieving an encapsulation template that defines one or more encapsulation pointers; and copying the one or more encapsulation pointers from the encapsulation template into a packet context for the data packet.

5. A method for replicating a data packet, the data packet associated with a packet context in a services processor, the method comprising:
  sending a processed original data packet and a switch bit to a scheduler for output,
    wherein the switch bit indicates whether the processed original data packet is to be replicated; and
  responsive to the switch bit,
    making a copy of the original data packet in an associated memory,
    queuing the original or the copied data packet for output, and
    continuing to process the non-queued data packet in the packet context.

6. A services processor for adding an encapsulation to a data packet, the data packet associated with a packet context in a services processor wherein the packet context includes a set of encapsulation pointers, the services processor encoded with instructions for:
  retrieving an encapsulation template that defines one or more encapsulation pointers; and
  copying the encapsulation pointers from the encapsulation template into the packet context for the data packet.

* * * * *